Patented Oct. 1, 1935

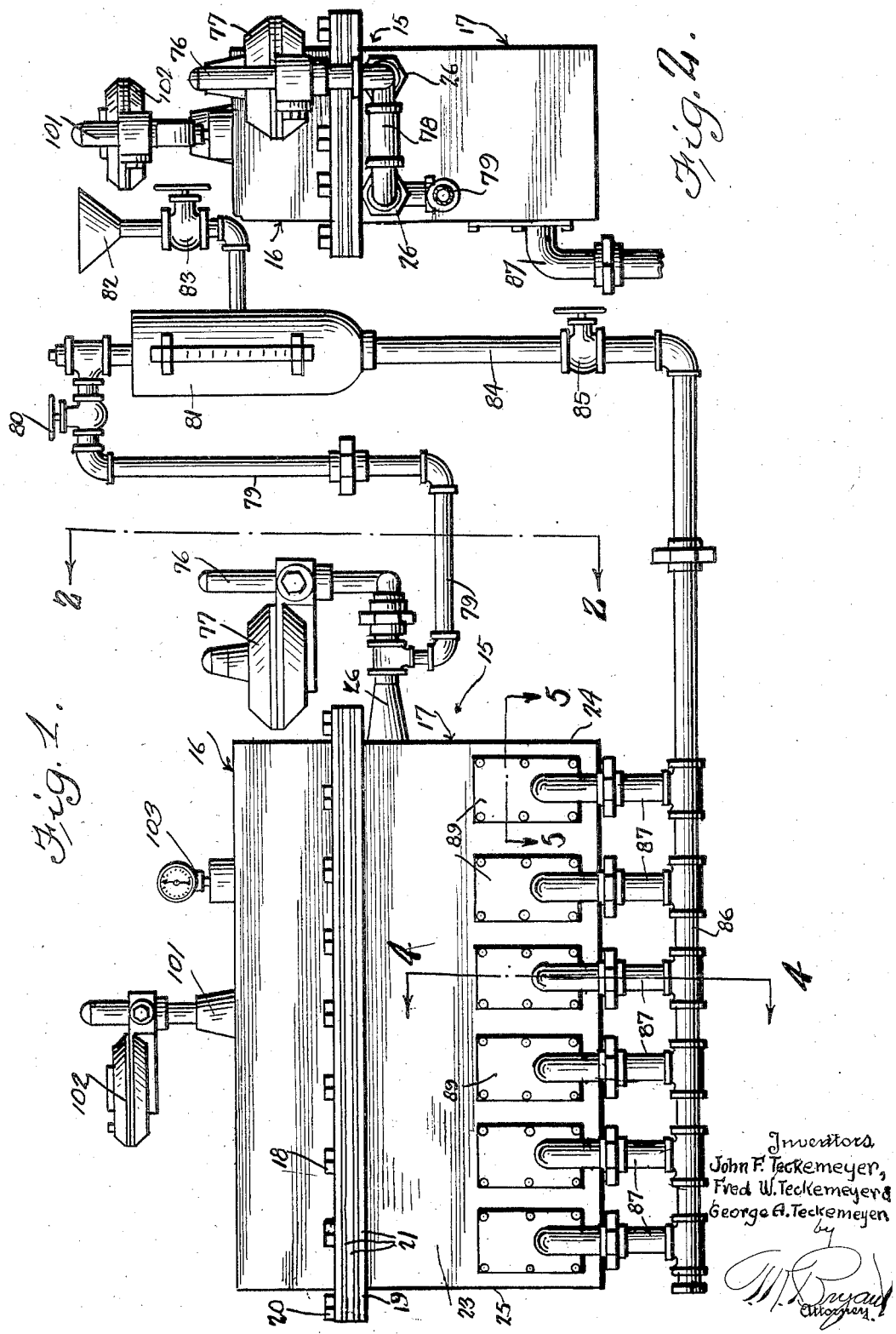

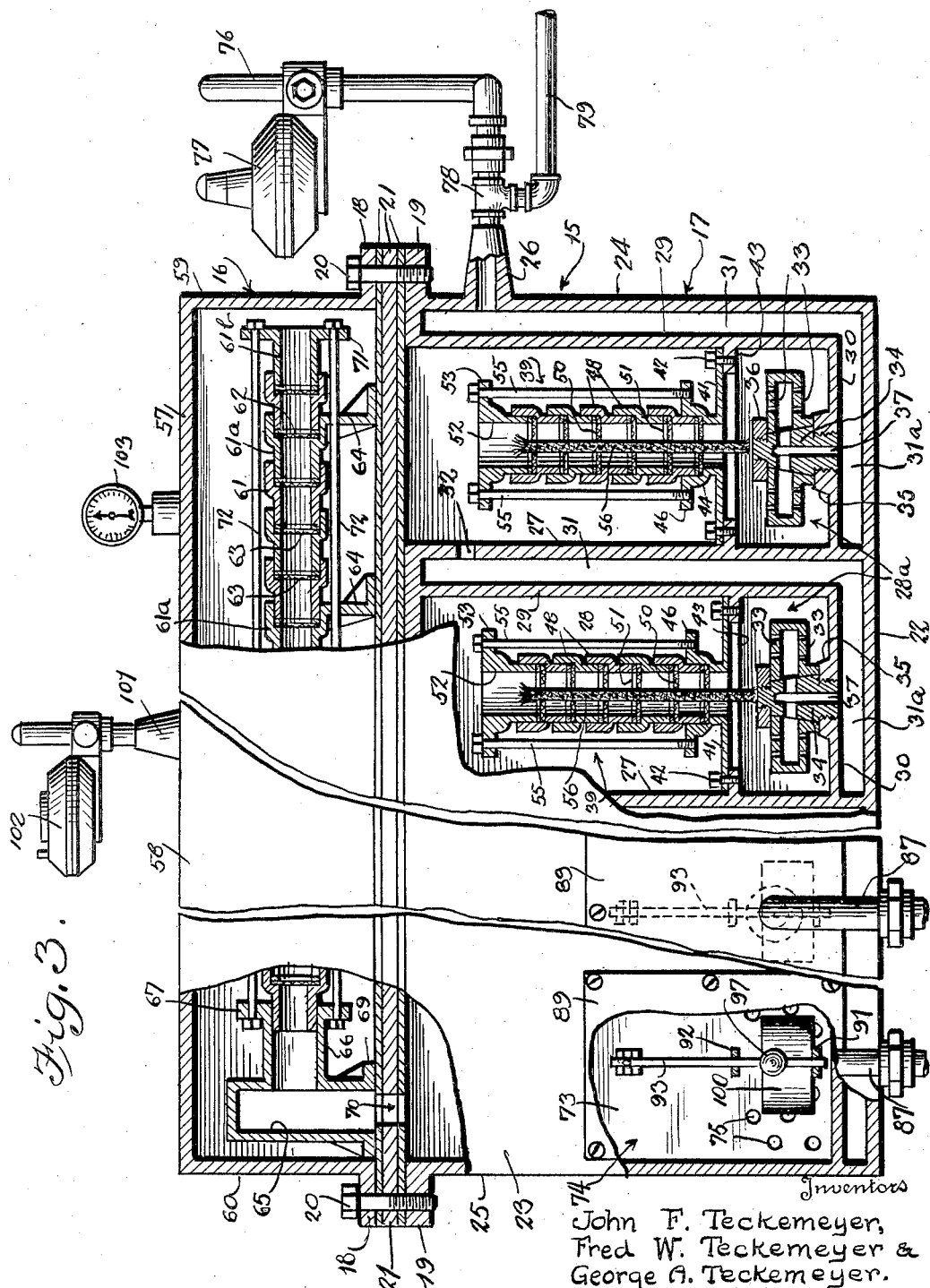

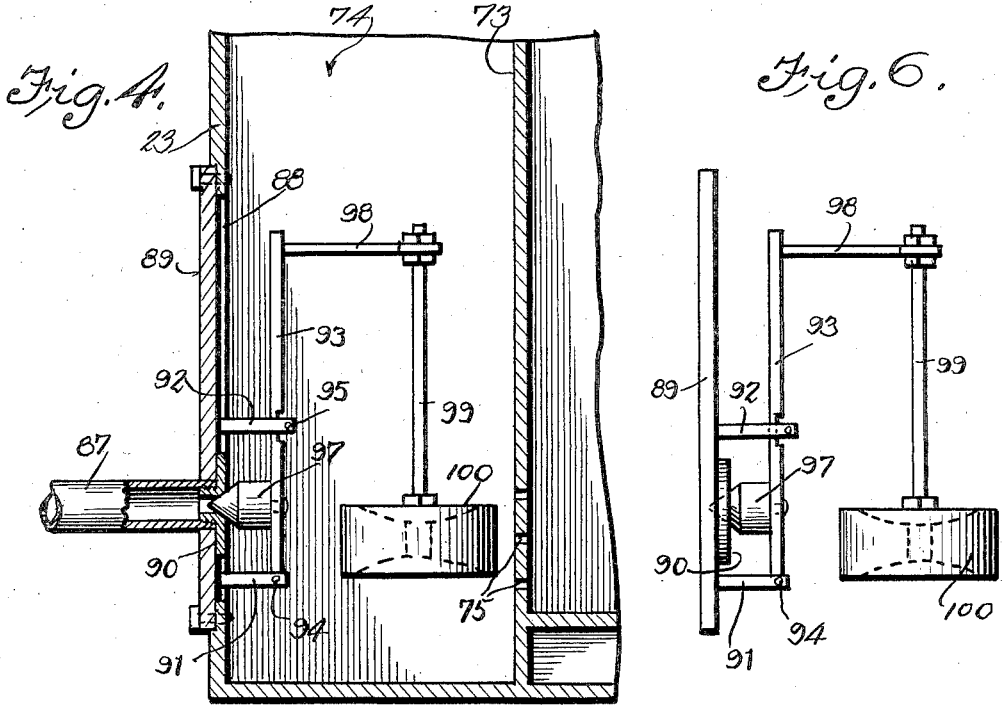
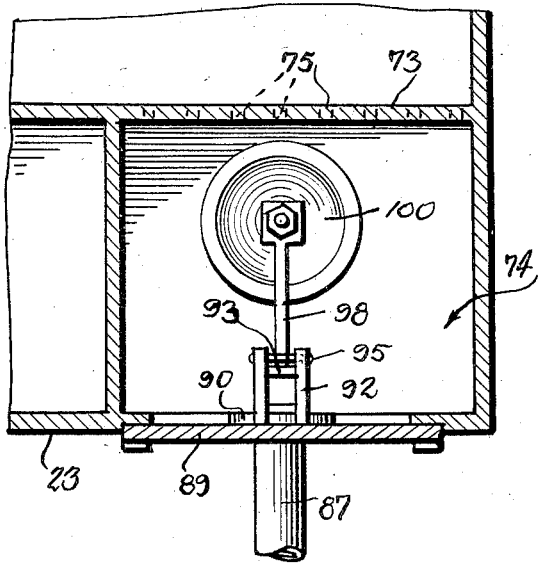
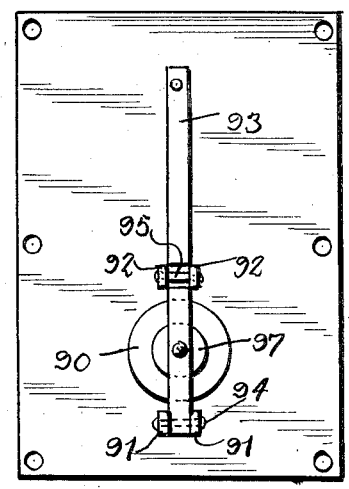

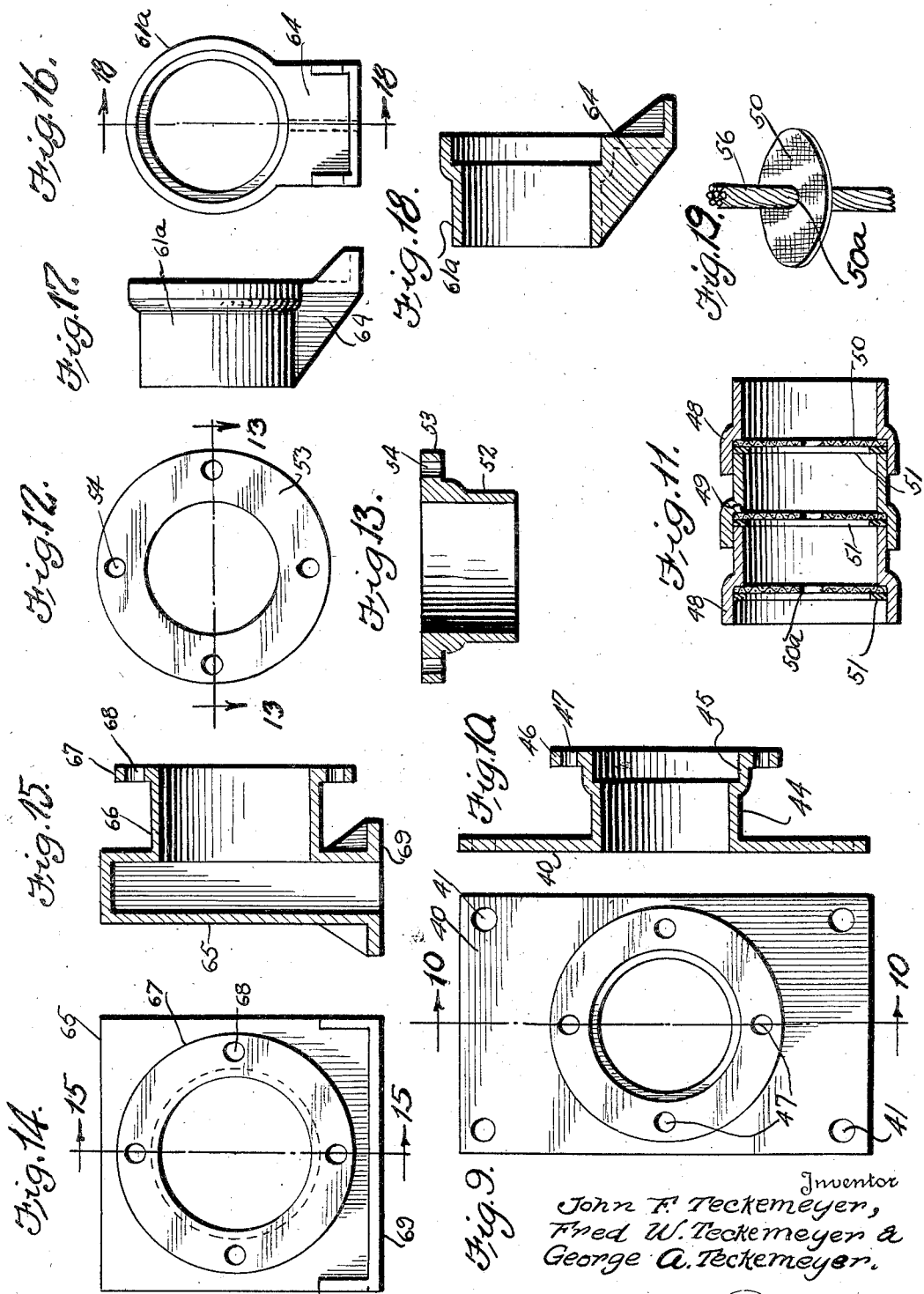

2,016,184

UNITED STATES PATENT OFFICE 2,016,184

GAS PRODUCING APPARATUS OF THE LIQUID CONTACT TYPE

John F. Teckemeyer, Frederick W. Teckemeyer, and George A. Teckemeyer, Pittsburgh, Pa., assignors of twenty-two per cent to Loran L. Lewis, five per cent to Charles Bosau, two per cent to Chester Marquis, and five per cent to Norval R. Ward, Pittsburgh, Pa.

Application October 16, 1934, Serial No. 748,558

11 Claims. (Cl. 261—124)

This invention relates to certain new and useful improvements in gas producing apparatus of the liquid contact type.

The primary object of the invention is to provide a gas producing apparatus of the liquid contact type of the character disclosed in application filed by John F. Teckemeyer et al. on July 1, 1933, Serial No. 678,684 and embodies improvements in the art thereover by producing a more highly purified converted gas, apparatus that is more economical to manufacture and of a simplified construction to facilitate assembly and installation, the apparatus disclosed in this application being designed to treat any type of volatile liquid hydrocarbon or petroleum, casing head gas or the like.

A further object of the invention is to provide a gas producing apparatus of the foregoing character wherein air under pressure is flowed in contact with a liquid hydrocarbon, casing head gas or the like and at normal or room temperature, as distinguished from heating methods, to be passed through a confined or restricted passageway in contact with fuel saturated porous evaporators for converting the liquid hydrocarbon into gas and thereafter fed through a confined or restricted passageway containing liquid absorption or drying elements for the purification, cleaning and drying of the gas that issues from the apparatus in a "high test condition" for illuminating, cooking, industrial and other purposes.

It is a further object of the invention to provide a gas producing apparatus wherein the gas produced by contact of compressed air with casing head gas or the like moves in a circuitous path through the apparatus that comprises a sequential arrangement of evaporators with the converted gas flowing in contact with the casing head gas and evaporator, resulting in a higher grade of converted gas in a purified, cleaned and dried condition issuing from the apparatus.

It is a further object of the invention to provide gas producing apparatus embodying a series of evaporator units each having an evaporator chamber and a float controlled liquid chamber in communication therewith to insure proper feeding of liquid to the evaporator chambers.

With the above and other objects in view that will become apparent as the nature of the invention is better understood, the same consists in the novel form, combination and arrangement of parts hereinafter more fully described, shown in the accompanying drawings and claimed.

In the drawings:—

Figure 1 is a side elevational view of the gas producing apparatus of the liquid contact type constructed in accordance with the present invention, illustrating a fuel supply for each evaporator unit;

Figure 2 is a vertical sectional view taken on line 2—2 of Figure 1;

Figure 3 is a front elevational view, partly broken away and partly shown in section to illustrate the liquid hydro-carbon or casing head gas chamber and associated evaporator unit, the float chamber for each evaporator unit, and also the gas purifying, cleaning and drying elements at the head of the casing of the apparatus;

Figure 4 is a detail vertical sectional view taken on line 4—4 of Figure 1, showing the float chamber for each evaporator unit;

Figure 5 is a detail horizontal sectional view taken on line 5—5 of Figure 1, showing the partition wall between the float and evaporator chambers and the overflow openings in the partition wall;

Figure 6 is a side elevational view of the float mechanism and its supporting plate detached from the casing;

Figure 7 is a rear elevational view of the supporting plate for the valve mechanism with the float arm and float removed;

Figure 8 is a side elevational view of the float operated valve lever controlling the supply of casing head gas or the like to the float chambers;

Figure 9 is a top plan view of the base member of an evaporator unit;

Figure 10 is a cross-sectional view taken on line 10—10 of Figure 9;

Figure 11 is a detail sectional view of three telescoping members of an evaporator unit with an absorbent disk confined between each two members;

Figure 12 is a top plan view of the head member of the evaporator unit;

Figure 13 is a cross-sectional view taken on line 13—13 of Figure 12;

Figure 14 is a front elevational view of the end member of the purifying, cleaning and drying unit at the upper end of the casing that is in communication with the evaporator;

Figure 15 is a cross-sectional view taken on line 15—15 of Figure 14;

Figure 16 is a front elevational view of one of the members of the purifying, cleaning and drying unit, showing a foot support for said unit carried thereby;

Figure 17 is a side elevational view of the member shown in Figure 16;

Figure 18 is a cross-sectional view taken on line 18—18 of Figure 16; and

Figure 19 is a perspective view of one of the absorbent disks and the wick or cap for capillary spread of casing head gas or the like to the disks.

Referring more in detail to the accompanying drawings, there is illustrated gas producing apparatus of the liquid contact type embodying a casing 15, preferably of rectangular form and including upper and lower sections 16 and 17 respectively housing the purifying, cleaning and drying unit, and the evaporator units. The upper section 16 is open at its bottom and the lower section 17 is open at its top, the adjacent edges of the walls of the sections being provided with flanges 18 and 19 projecting outwardly of the respective casing sections to facilitate clamping of the two sections together by the devices 20 with packing sheets 21 interposed therebetween to effect a gas-tight connection between the two sections.

The lower section 17 of the casing 15 further includes a bottom wall 22, side walls 23 and end walls 24 and 25. The end wall 24 of the lower section 17 has inlets 26 adjacent its upper end for communication with a source of compressed air. The lower section 17 is provided with a series of vertical partitions 27, extending from the upper end thereof to the bottom wall 22, providing compartments 28, and each compartment 28 has an angular partition therein comprising a vertical wall 29 and a horizontal wall 30 adjacent the end wall 24 and partitions 27 and the bottom wall 22, to provide angular air or gas passages 31 and 31a respectively. Each compartment 28 communicates with the succeeding air passage 31 adjacent its upper end by means of the opening 32 in the vertical partition wall 27.

A bubbler or spray device for liquid hydrocarbon, casing head gas or the like, is mounted in the lower end of each compartment 28 upon the horizontal wall 30 of the angular partition, the bubbler or spray device comprising a circular casing including adjacently positioned perforated top and bottom walls 33 having axial registering tapering openings therein to receive a mounting plug 34 that has threaded engagement at its lower projecting end with the boss 35 rising from the partition wall 30, the bubbler casing being retained in engagement with the plug 34 by means of the nut 36 threaded upon the upper projecting end of the plug and engaged with the top wall of the casing. The plug 34 is provided with an axial bore 37 communicating with the passage 31a and lateral bores forming communication between the bore 37 and the interior of the bubbler casing so that air and gas blowing through the passages 31 and 31a enters the bubbler for discharge through the perforated top and bottom walls 33 thereof.

Means is provided in each compartment 28 above the bubbler device for effecting gaseous liquid contact of air under pressure flowing therethrough and is in the form of an evaporator unit comprising a plurality of members assembled as a unit for mounting in the compartment. The evaporator unit illustrated in Figure 3 is shown in detail in Figures 9 to 13, the evaporator unit 39 being perpendicularly disposed in the compartment 28 and comprising a base member having a rectangular plate 40 provided with edge perforations 41 to facilitate the passage of fastening devices 42 that secure the base plate 40 to the supporting flanges 43 projecting inwardly of the partition walls 27 and 29. As shown more clearly in Figures 3 and 10, a tubular collar centrally rises from and surrounds an opening in the base plate 40, the collar 44 having an offset shoulder 45 adjacent its upper end and further carrying an outwardly directed flange 46 that is perforated as at 47. A plurality of nested members 48 has the lower member of the group seated on the offset shoulder 45 of the base plate 40 and each member 48 has a shoulder 49 upon which the marginal edge of an absorbent disk 50 is seated, the absorbent disk 50 being surmounted by a packing ring 51, the absorbent disk and packing ring assembly being confined between the shoulder 49 and adjacent end of the next member 48 as shown in Figure 11. Each evaporator unit 39 further includes a head member 52 nested or telescoped into the upper member 48 of the group and is of tubular formation, being provided on its upper end with an outwardly directed annular flange 53 provided with spaced openings 54 therein, as shown in detail in Figures 12 and 13. Tie rods 55 pass through the openings 54 in the flange 53 of the head member 52 and through the openings 47 within the flange 46 upon the base member 40, these tie rods preferably being in the form of headed bolts with the heads thereof engaged with the upper sides of the flange 53 while the lower ends thereof are threaded into the opening 47. A wick 56 as shown in Figs. 3 and 19 extends through axial openings 50a in the absorbent disks 50, being in contact therewith, the lower end of the wick terminating adjacent the upper end of the bubbler or spray device and submerged in the liquid hydrocarbon, casing head gas or like material delivered to the lower end of the compartment 28 below the base plate 40 of the evaporator unit to effect saturation of the porous disks 50 by capillary attraction, the upper end of the wick 56 extending slightly above the upper porous disk 50.

Means for purifying, cleaning and drying gas generated in the lower section 17 of the casing is located in the upper section 16, the upper casing section comprising a top wall 57, side walls 58 and end walls 59 and 60. The gas drying device comprises a plurality of nested or telescoping members 61, similar in construction to the members 48 of the evaporators with a porous absorbent disk 62 and a packing ring 63 confined between each two members 61 and as shown in Figures 3 and 16 to 18, certain ones of said members 61 designated by the reference character 61a, preferably spaced five members apart are each provided with a depending supporting foot 64 resting upon the members interposed between and separating the upper and lower sections 16 and 17 of the casing 15. A header is associated with one end of the device for purifying, cleaning and drying the gas and as shown in Figs. 3, 16, and 15, the same includes a casing 65 having a cylindrical neck 66 projecting laterally thereof and carrying at its free end an annular flange 67 provided with a series of openings 68. The header casing 65 is open at its lower end and combined with the neck 66 provides an angle passage therethrough, the lower end of the casing 65 carrying a mounting foot 69 supported upon the members separating the upper and lower sections of the casing. The casing 65 is located in the upper section 16 adjacent the end wall 60 above the adjacent compartment 28, and the separating members between the two sections of the casing are provided with an opening 70 forming communication between the adjacent compartment 28 and the header casing 65. One of the members 61 is telescopically received in the neck 66 of the header casing and the opposite end member 61b carries an outwardly directed annular flange 71 provided with openings, the tie rods 72 passing through the openings in the flanges 67 and 71 holding the members 61 and 61a in assembled relation, similar to the tie rods 55 for holding the members 48 of the evaporator unit.

The base plate 40 of each evaporator unit provides a lower chamber 28a below the compartment 28 and liquid hydrocarbon, casing head gas or the like is adapted to be delivered to the several chambers 28a.

A float chamber for supplying hydrocarbon, casing head gas or the like, is associated with each chamber 28a and as shown in Figures 1 to 8, a vertical partition wall 73 parallel with the front wall 23 of the lower casing section 17 separates the chambers 28 and 28a from the float chamber 74 and each partition wall 73 adjacent its lower end is provided with a plurality of overflow openings 75 to permit the flow of casing head gas or the like from the float chamber into the bubbler chamber 28a. Air under pressure is in communication with the air inlet 26 of the lower casing section 17 and this compressed air is also adapted for feeding the casing head gas to the float chambers 74. As shown in Figures 1 and 2, a pipe 76 in communication with a source of air under pressure and provided with a pressure regulating valve 77 leads to a manifold 78 that has two outlets in communication with the air inlets 26 and a branch pipe 79 extending from the manifold 78 and valve controlled as at 80 communicates with the upper end of the supply tank 81 and receives a charge of casing head gas or the like through the filler 82 and under control of the valve 83. The tank 81 has an outlet pipe 84, valve controlled as at 85, and extending to a manifold 86 adjacent the casing 15 with branch pipes 87 extending from the manifold 86 to enter each float chamber 74.

The front wall 23 of the lower casing section 17 in line with each float chamber 74 is provided with a relatively large opening 88 that is adapted to be closed by a removable plate 89 that supports the branch pipe 87 and also the float controlled valve mechanism for regulating the quantity of casing head gas or the like delivered to the float chamber. As shown in Figs. 4 to 8, a valve seat 90 is secured to the inner face of the plate 89 and has a nipple extending into the adjacent branch pipe 87. Vertically spaced pairs of lugs 91 and 92 project from the inner face of the plate 89 respectively below and above the valve seat 90 and a valve carrying lever rod 93 is pivotally supported at its lower end as at 94 in the lower lugs 91 with the intermediate portion of the lever rod 93 being positioned between the upper lugs 92. A cross pin 95 extends between the outer ends of the lugs 92 and registers with a notch 96 in the adjacent side edge of the lever rod 93 to permit limited movement of the lever rod on its pivotal mounting 94 and preventing complete removal of the lever rod from between the lugs 92. A conical valve 97 is carried by the lever rod 93 for engagement with the valve seat 90, shown in Figures 4 and 6. An arm 98 projects at right angles from the upper end of the lever rod 93 and has adjustably connected to its free end, a float rod 99 carrying a float 100 at its lower end.

A liquid hydrocarbon, casing head gas or the like is maintained at the desired level in the chamber 28a by being fed thereto under pressure and controlled by the float valve mechanism so that each chamber 28a is assured of the proper quantity of liquid, that overflows through the openings 75 in the partition walls 73 into the chambers 28a. Air under pressure is delivered to the casing 15 through the inlet 26 and travels through the angular passages 31 and 31a at one end of the casing to enter the bubbler or spray device in the chamber 28a. The air bubbles upwardly through the liquid and moving in an upward direction contacts and passes through the porous disks 56 that are saturated by capillary attraction by means of the wick 56, the path of travel being confined in the evaporator unit 39 and escaping therefrom into the upper compartment 28. This action produces a semi-dried vapor gas that escapes from the first compartment 28 through the opening 32 in the vertical partition 27 to the angle passages 31 and 31a of the next compartment 28 where a similar action is effected except that in each succeeding compartment, a semi-dried vapor gas flows through the bubbler or spray device for final passage through the opening 70 in the last compartment 28 to enter the header casing 65 of the purifying, cleaning and drying unit in the upper section 16 of the casing. Vapor gas in a purified, cleaned and dried condition fills the upper section 16 of the casing and outlets at the point 101 for consumption, the outlet having a pressure regulating valve 102 while a pressure gage 103 is carried by the upper casing section 16. The bubbler device in each chamber 28a produces saturated bubbles that rise upwardly through each evaporator unit for the deposit of moisture upon the porous disks 62 and the escape of a vapor gas in a semi-dried condition into each compartment 28, vapor gas finally issuing from the casing at the point 101 for purposes of consumption in a thoroughly purified, cleaned and dried condition, possessing increased heating value and produced in the absence of inexpensive heating methods, the temperature of the compressed air being normal or at room temperature.

From the above detailed description of the invention it is believed that the construction and operation thereof will at once be apparent and while there is herein shown and described the preferred embodiment of the invention, it is nevertheless to be understood that minor changes may be made therein without departing from the spirit and scope of the invention as claimed.

We claim:—

1. In gas producing apparatus of the liquid contact type, a casing, a series of communicating evaporators at the bottom of the casing, a purifying, cleaning and drying device at the upper end of the casing, means for feeding liquid fuel for conversion to each evaporator, means for feeding air under pressure at one end of the series of evaporators and an outlet for vapor gas at the upper end of the casing, a bubbler device beneath each evaporator, each evaporator including a base plate supported on the walls of the compartment and having a confined passageway, spaced porous disks in the passageway and a wick extending through the disks to effect saturation thereof by capillary attraction.

2. In gas producing apparatus of the liquid contact type, a casing, a series of communicating evaporators at the bottom of the casing, a purifying, cleaning and drying device at the upper end of the casing, means for feeding liquid fuel for conversion to each evaporator, means for feeding air under pressure at one end of the series of evaporators, and an outlet for vapor gas at the upper end of the casing, said casing having a series of communicating compartments, one for each evaporator, a bubbler device beneath each evaporator, each evaporator including a base plate supported on the walls of the compartment and having a confined passageway, spaced porous disks in the passageway and a wick extending through the disks to effect saturation thereof by capillary attraction.

3. In gas producing apparatus of the liquid contact type, a casing, a series of communicating evaporators, at the bottom of the casing, a purifying, cleaning and drying device at the upper end of the casing, means for feeding liquid fuel for conversion to each evaporator, means for feeding air under pressure at one end of the series of evaporators, an outlet for vapor gas at the upper end of the casing, said casing having a series of communicating compartments, one for each evaporator, and each evaporator exhausting into its compartment, a bubbler device beneath each evaporator, each evaporator including a base plate supported on the walls of the compartment and having a confined passageway, spaced porous disks in the passageway and a wick extending through the disks to effect saturation thereof by capillary attraction.

4. In gas producing apparatus of the liquid contact type, a casing, a series of communicating evaporators at the bottom of the casing, a purifying, cleaning and drying device at the upper end of the casing, means for feeding liquid fuel for conversion to each evaporator, means for feeding air under pressure at one end of the series of evaporators and an outlet for vapor gas at the upper end of the casing, a bubbler device beneath each evaporator, each evaporator including a base plate supported on the walls of the compartment, and comprising a plurality of nested members, each having an offset shoulder to receive the reduced end of an adjacent member, a porous disk and packing ring on each offset shoulder between adjacent members and a wick extending through the porous disks.

5. In gas producing apparatus of the liquid contact type, a casing, a series of communicating evaporators at the bottom of the casing, a purifying, cleaning and drying device at the upper end of the casing, means for feeding liquid fuel for conversion to each evaporator, means for feeding air under pressure at one end of the series of evaporators, and an outlet for vapor gas at the upper end of the casing, said casing having a series of communicating compartments, one for each evaporator, a bubbler device beneath each evaporator, each evaporator including a base plate supported on the walls of the compartment, and comprising a plurality of nested members, each having an offset shoulder to receive the reduced end of an adjacent member, a porous disk and packing ring on each offset shoulder between adjacent members and a wick extending through the porous disks.

6. In gas producing apparatus of the liquid contact type, a casing, a series of communicating evaporators, at the bottom of the casing, a purifying, cleaning and drying device at the upper end of the casing means for feeding liquid fuel for conversion to each evaporator, means for feeding air under pressure at one end of the series of evaporators, an outlet for vapor gas at the upper end of the casing, said casing having a series of communicating compartments, one for each evaporator, and each evaporator exhausting into its compartment, a bubbler device beneath each evaporator, each evaporator including a base plate supported on the walls of the compartment, and comprising a plurality of nested members, each having an offset shoulder to receive the reduced end of an adjacent member, a porous disk and packing ring on each offset shoulder between adjacent members and a wick extending through the porous disks.

7. In gas producing apparatus of the liquid contact type, a casing, a series of communicating evaporators at the bottom of the casing, a purifying, cleaning and drying device at the upper end of the casing, means for feeding liquid fuel for conversion to each evaporator, means for feeding air under pressure at one end of the series of evaporators and an outlet for vapor gas at the upper end of the casing, a bubbler device beneath each evaporator, each evaporator including a base plate supported on the walls of the compartment and having a confined passageway, spaced porous disks in the passageway and a wick extending through the disks to effect saturation thereof by capillary attraction, the purifying, cleaning and drying device including a series of nested members with a porous disk interposed between adjacent members, means forming communication between the last end evaporator compartment and the purifying, cleaning and drying device, and the upper end of the casing having an outlet for vapor gas.

8. In gas producing apparatus of the liquid contact type, a casing, a series of communicating evaporators at the bottom of the casing, a purifying, cleaning and drying device at the upper end of the casing, means for feeding liquid fuel for conversion to each evaporator, means for feeding air under pressure at one end of the series of evaporators, and an outlet for vapor gas at the upper end of the casing, said casing having a series of communicating compartments, one for each evaporator, a bubbler device beneath each evaporator, each evaporator including a base plate supported on the walls of the compartment and having a confined passageway, spaced porous disks in the passageway and a wick extending through the disks to effect saturation thereof by capillary attraction, the purifying, cleaning and drying device including a series of nested members with a porous disk interposed between adjacent members, means forming communication between the last end evaporator compartment and the purifying, cleaning and drying device and the upper end of the casing having an outlet for vapor gas.

9. In gas producing apparatus of the liquid contact type, a casing, a series of communicating evaporators, at the bottom of the casing, a purifying, cleaning and drying device at the upper end of the casing, means for feeding liquid fuel for conversion to each evaporator, means for feeding air under pressure at one end of the series of evaporators, an outlet for vapor gas at the upper end of the casing, said casing having a series of communicating compartments, one for each evaporator, and each evaporator exhausting into its compartment, a bubbler device beneath each evaporator, each evaporator including a base plate supported on the walls of the compartment and having a confined passageway, spaced porous disks in the passageway and a wick extending through the disks to effect saturation thereof by capillary attraction, the purifying, cleaning and drying device including a series of nested members with a porous disk interposed between adjacent members, means forming communication between the last end evaporator compartment and the purifying, cleaning and drying device and the upper end of the casing having an outlet for vapor gas.

10. In gas producing apparatus of the liquid contact type, a casing, a series of communicating evaporators at the bottom of the casing, a purifying, cleaning and drying device at the upper end of the casing, means for feeding liquid fuel for conversion to each evaporator, means for feeding air under pressure at one end of the series of evaporators, and an outlet for vapor gas at the upper end of the casing, said casing having a series of communicating compartments, one for each evaporator, a bubbler device beneath each evaporator, each evaporator, including a base plate supported on the walls of the compartment and having a confined passageway, spaced porous disks in the passageway and a wick extending through the disks to effect saturation thereof by capillary attraction, a liquid fuel receiving chamber within the casing for each compartment and a float operated valve in each receiving chamber whereby the liquid fuel supply from a single source maintains a constant level in all of the receiving chambers.

11. In gas producing apparatus of the liquid contact type, a casing, a series of communicating evaporators, at the bottom of the casing, a purifying, cleaning and drying device at the upper end of the casing, means for feeding liquid fuel for conversion to each evaporator, means for feeding air under pressure at one end of the series of evaporators, an outlet for vapor gas at the upper end of the casing, said casing having a series of communicating compartments, one for each evaporator and each evaporator exhausting into its compartment, a bubbler device beneath each evaporator, each evaporator including a base plate supported on the walls of the compartment and having a confined passageway, spaced porous disks in the passageway and a wick extending through the disks to effect saturation thereof by capillary attraction, a liquid fuel receiving chamber within the casing for each compartment and a float operated valve in each receiving chamber whereby the liquid fuel supply from a single source maintains a constant level in all of the receiving chambers.

JOHN F. TECKEMEYER.
FREDERICK W. TECKEMEYER.
GEORGE A. TECKEMEYER.